(12) United States Patent
Pfaff et al.

(10) Patent No.: US 7,984,890 B2
(45) Date of Patent: Jul. 26, 2011

(54) PILOT OPERATED VALVE WITH FAST CLOSING POPPET

(75) Inventors: Joseph L. Pfaff, Wauwatosa, WI (US); Gennady Shimelfarb, Waukesha, WI (US); Christopher E. Lentz, Waukesha, WI (US)

(73) Assignee: INCOVA Technologies, Inc., Waukesha, WI (US)

( * ) Notice: Subject to any disclaimer, the term of this patent is extended or adjusted under 35 U.S.C. 154(b) by 821 days.

(21) Appl. No.: 12/037,558

(22) Filed: Feb. 26, 2008

(65) Prior Publication Data
US 2009/0212244 A1    Aug. 27, 2009

(51) Int. Cl.
F16K 31/00    (2006.01)
F16K 31/06    (2006.01)

(52) U.S. Cl. .............. 251/30.04; 251/30.01; 137/269
(58) Field of Classification Search .......... 251/33, 251/34, 35, 36, 38, 29, 30.03, 30.04, 30.05; 137/102
See application file for complete search history.

(56) References Cited

U.S. PATENT DOCUMENTS

| | | | |
|---|---|---|---|
| 3,036,807 A * | 5/1962 | Lucky et al. ............. | 251/28 |
| 4,779,837 A * | 10/1988 | Mito et al. ............. | 251/26 |
| 5,878,647 A | 3/1999 | Wilke et al. | |
| 6,073,652 A | 6/2000 | Wilke et al. | |
| 6,149,124 A | 11/2000 | Yang | |
| 6,289,859 B1 * | 9/2001 | Fujii et al. ............. | 123/90.15 |
| 6,328,275 B1 | 12/2001 | Yang et al. | |
| 6,745,992 B2 | 6/2004 | Paik et al. | |
| 7,341,236 B2 | 3/2008 | Stephenson et al. | |
| 7,784,488 B2 * | 8/2010 | Holder et al. ............. | 137/488 |
| 2007/0157980 A1 | 7/2007 | Stephenson et al. | |

* cited by examiner

*Primary Examiner* — John Rivell
*Assistant Examiner* — Jonathan Waddy
(74) *Attorney, Agent, or Firm* — Quarles & Brady LLP; George E. Haas

(57) ABSTRACT

A pilot-operated valve has a main poppet controlling fluid flow between inlet and outlet ports in response to pressure in a control chamber. Fluid flow through a pilot passage, linking the control chamber and the outlet port, moves an exhaust spool between first and second positions to control fluid flow through passages in the main poppet. The first position blocks flow between the control chamber and the outlet port and provides a path between the control chamber and the inlet port. In the second position, flow between the control chamber and the outlet port is enabled, and a second path, that is more restricted than the first path, is provided between the control chamber and the inlet port. When the valve closes, flow through the first path allows movement of the main poppet at a faster rate than during opening when flow occurs through the more restricted second path.

20 Claims, 3 Drawing Sheets

PILOT OPERATED VALVE WITH FAST CLOSING POPPET

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to hydraulic valves, and more particularly to unbalanced, pilot-operated poppet valves.

2. Description of the Related Art

A wide variety of machines have moveable components which are operated by an hydraulic actuator, such as a cylinder and piston arrangement, that is controlled by a hydraulic valve assembly. A common hydraulic valve assembly comprises four electrohydraulic valves arranged in a Wheatstone bridge configuration with each valve in a different leg of the square bridge. One corner of the bridge is connected to a supply conduit, while the opposite corner of the bridge is connected to a tank return conduit. The other two corners are connected to the chambers of the hydraulic actuator. Opening two valves on opposite legs of the bridge sends fluid from the supply conduit to one actuator chamber and drains fluid from the other chamber. Selecting a particular pair of valves determines the direction in which the hydraulic actuator moves.

The valves often are electrohydraulic poppet valves (EHPV) in which the poppet is pilot-operated by a linear actuator, such as a solenoid. Applying electric current to an electromagnetic coil of the solenoid moves an armature that acts on a pilot valve element to open a pilot passage in a main valve poppet. Opening the pilot passage releases pressure in a control chamber, thereby allowing the main valve poppet to move away from a valve seat which motion creates a path between the inlet and outlet of the valve. The amount that the main valve poppet moves, and thus the degree that the valve opens, is directly related to the magnitude of electric current applied to the electromagnetic coil, thereby enabling proportional control of the hydraulic fluid flow. Either the armature, another valve component, or both is spring biased to close the valve when electric current is removed from the electromagnetic coil The pressure differential across the valve affects the speed at which the main valve poppet opens and closes. That pressure differential changes with variation in the load applied to the machine component operated by the hydraulic fluid from the valve, as well as by variation of the supply fluid pressure. In the closed state, the pressure differential can affect the amount of force required to open the valve and to produce a desired fluid flow through the valve.

The adverse effects of varying differential pressure were previously addressed by providing a stem on the pilot valve element which extended into the pilot passage in the main poppet, as shown in U.S. Pat. No. 5,878,647. Pressure on both sides of the main poppet were applied to different surfaces of this stem which caused the pilot poppet to move in a manner that opened and closed passages between the valve ports and the control chamber for the main poppet thereby counteracting the effects of variation in the differential pressure. This stem commonly is referred to as a pressure balancing stem. Nevertheless a pressure balanced valve of this type had durability, leakage, and pilot force sensitivities as compared to an unbalanced valve.

Although use of an unbalanced valve avoided those sensitivities, that type of valve did not always provide the dynamic response required for a some hydraulic systems, such as those for earth excavators. Specifically the closing speed of an unbalanced valve when the electric current terminated often was not fast enough to properly control the associated hydraulic actuator.

Therefore, it is desirable to improve the closing speed of an unbalanced electrohydraulic poppet valve.

SUMMARY OF THE INVENTION

A pilot operated hydraulic valve has a body with a first port, a second port, and a valve seat between those ports. A main poppet selectively engages the valve seat to control flow of fluid from one port to the other port. A control chamber is defined in the body on a side of the main poppet that is remote from the valve seat. The main poppet has an aperture that opens into the control chamber. A first control passage extends between the aperture and the control chamber and also communicates through an orifice to the aperture. A second control passage extends between the first port and the aperture, and a third control passage extends between the second port and the aperture.

An exhaust spool moves in response to fluid flow into the aperture from the control chamber. That exhaust spool has a first position in which fluid flow between the control chamber and the third control passage is blocked, and in which a path is provided between the first and second control passages bypassing the orifice. In a second position of the exhaust spool, fluid flow between the control chamber and the third control passage is enabled, and communication between the first and second control passages is blocked.

A pilot valve element operates to open and close fluid communication between the control chamber and the aperture of the main poppet. An actuator, that preferably is electrically operated, is operably coupled to move the pilot valve element.

When the valve is moving toward a more open position, the exhaust spool is in the second position wherein fluid flow from the first port into the control chamber is restricted by the orifice in the first control passage. That restriction enables proper modulation of the valve. When electric current is removed from the actuator to close the valve, the exhaust spool enters the first position and provides a path around the orifice, thereby enabling a greater fluid flow from the first port into the control chamber than in the second position.

DETAILED DESCRIPTION OF THE INVENTION

Figure 1:
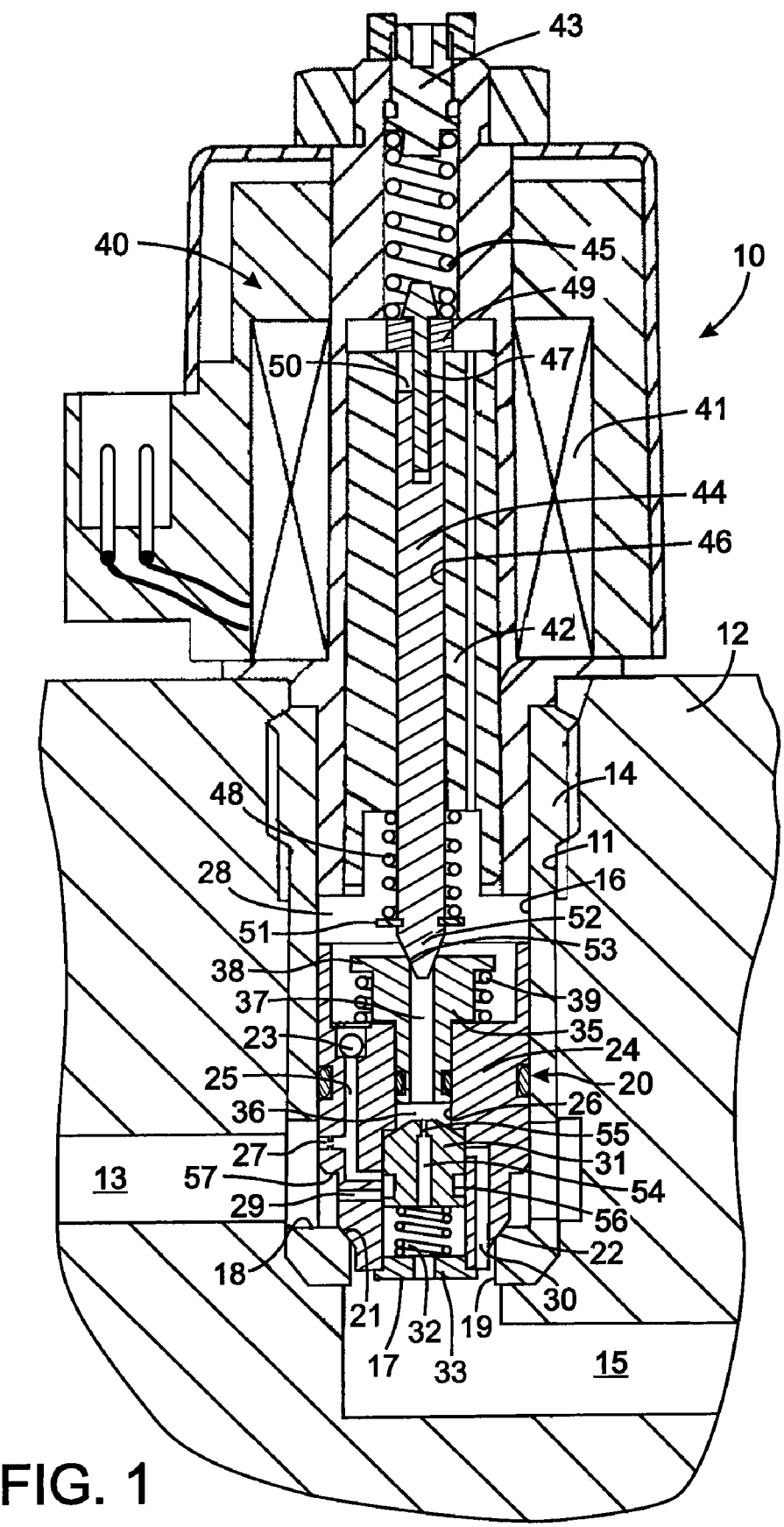
FIG. 1 is a cross sectional view through an electrohydraulic pilot-operated poppet valve in a closed state.

With reference to FIG. 1, a solenoid operated hydraulic valve 10 comprises a cylindrical valve body 14 that is mounted in an aperture 11 of a valve block 12. A first conduit 13 and a second conduit 15 in the valve block 12 open into the aperture 11. The valve body 14 has a longitudinal first bore 16 with a side wall through which, a first, or inlet, port 18 opens. A second, or outlet, port 19 opens into an end of the valve body's first bore 16 and communicates with the a second conduit 15 in the valve block. In one application of the hydraulic valve 10, the first conduit 13 is coupled to a hydraulic actuator and the second conduit 15 leads to the tank of the hydraulic system. A valve seat 21 is formed in the first bore 16 between the first and second ports 18 and 19.

A poppet assembly 20 comprises a main poppet 24, an exhaust spool 31, and a pilot piston 35. The main poppet 24 slides within the valve body's first bore 16 and selectively engages and disengages the valve seat 21 to control flow of hydraulic fluid between the inlet and outlet ports 18 and 19. For that purpose, the nose 17 of the main poppet 24 has a frustoconical surface 22 that in the closed state of the valve abuts the valve seat 21. A centrally located aperture 26 extends through the main poppet 24 from the outlet port 19 to a control chamber 28 on the opposite side of the main poppet. A first control passage 25 extends transversely through the main poppet 24 between the central aperture 26 and the control chamber 28, and the first control passage 25 communicates with the inlet port 18 through a first orifice 27. A first check valve 23 is located near the opening of the first control passage 25 into the control chamber 28 and allows fluid to flow only in a direction from the first control passage into the control chamber. A second control passage 29 provides a fluid path linking the inlet port 18 to a point in the central aperture 26 between the opening of the first control passage 25 and the poppet's nose 17. A third control passage 30 forms a path in the main poppet 24 between the central aperture 26 and the outlet port 19. The opening of the third control passage 30 into the central aperture 26 is on the remote side of the opening of the second control passage 29 from the first control passage opening.

An exhaust spool 31 is slideably received in the main poppet's central aperture 26 near the nose 17. An exhaust passage 54, with an orifice 55, extends through the exhaust spool 31 enabling fluid to flow between the pilot chamber 36 and the outlet port 19. The exhaust spool 31 has an annular notch 56 around its outer surface. An exhaust spring 32 engages a retainer 33 and biases exhaust spool 31 inwardly into engagement with a shoulder of the central aperture 26. As will be described, movement of the exhaust spool 31 controls the flow of fluid in the three control passages 25, 29 and 30.

The pilot piston 35 is slideably received in the aperture 26 of the main poppet 24, thereby defining a pilot chamber 36 between the pilot piston and the exhaust spool 31. A pilot passage 37 extends through the pilot piston 35 between the control chamber 28 and the pilot chamber 36. The pilot piston 35 has an enlarged head 38 in the control chamber 28 and a pilot spring 39 biases the head away from the main poppet 24. A greater pressure in the control chamber 28 than in the outlet port 19, when the exhaust spool 31 opens the third passage, tends to push the pilot piston 35 farther into the main poppet 24 and compress pilot spring 39.

Movement of the main poppet 24 is controlled by an actuator, such as a solenoid actuator 40 that comprises an electromagnetic coil 41, an armature 42 and a rod-like pilot valve element 44. The armature 42 is slideably positioned within the first bore 16 in the valve body 14 and is biased toward the main poppet 24 by a first, or modulating, spring 45 that exerts a force which can be varied by an adjusting screw 43 threaded into an exposed end of the first bore. The electromagnetic coil 41 is located around and secured to valve body 14. The armature 42 slides within the first bore 16 away from main poppet 24 in response to an electromagnetic field created by applying electric current to the electromagnetic coil 41.

The pilot valve element 44 is slideably received in a second bore 46 in the tubular armature 42. A second spring 48, that engages a snap ring 51 secured to the pilot valve element, biases the pilot valve element 44 outward from that second bore 46 so that, in a de-energized state of the solenoid actuator 40, a proximate end with a conical tip 52 enters the pilot passage 37. The conical tip 52 engages the main poppet at a pilot seat 53 formed where the pilot passage 37 opens into the control chamber 28. A remote end 50 of the pilot valve element 44 is recessed within second bore 46 from the adjacent end of the armature 42 when the valve 10 is in the closed state as illustrated. That remote end has an aperture within which a pull pin 47 is press-fitted. The pull pin 47 has an exterior head that engages a washer 49 which is held between the end of the armature 42 and the first spring 45. A gap is created between the washer 49 and the adjacent end of the pilot valve element 44 that allows the pilot valve element to slide upward within the armature 42 and the first spring 45 against the force of the second spring 48 at the other end of the pilot valve element. The first spring 45 has a significantly greater spring rate than the second spring 48, so that force applied to the tip of the pilot valve element 44 will produce that sliding action before the armature 42 compresses the first spring.

In the de-energized state of the electromagnetic coil 41 shown in FIG. 1, pressure at the inlet port 18 is communicated through the first and second control passages 25 and 29 and the first check valve 23 into the control chamber 28. In this state the exhaust spool 31 is in a first position in which a notch 56 around the exhaust spool 31 provides a relatively large path between the first and second control passages 25 and 29. The first check valve 23 prevents the control chamber pressure from decreasing when the pressure at the inlet port 18 is lower. The first spring 45 forces the armature 42 toward the main poppet 24, while the second spring 48 forces the pilot valve element 44 outward from the armature also toward the main poppet. This combined action results in the pilot valve element's conical tip 52 closing the pilot passage 37 and blocking fluid communication between the control chamber 28 and the pilot passage 37. As a result, pressure is trapped within the control chamber 28, thereby resisting any force that tends to move the main poppet 24 off the main valve seat 21 and open the hydraulic valve 10.

Figure 2:
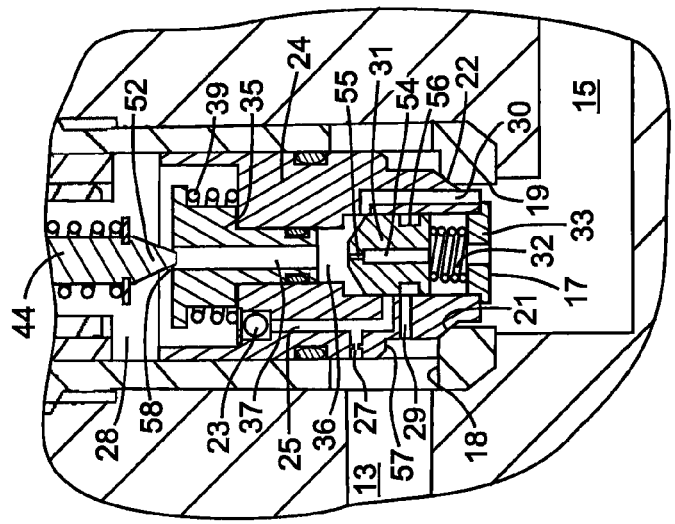
FIG. 2 is a cross sectional view through a portion of the valve in FIG. 1 illustrating the poppet beginning to open.
Figure 3:
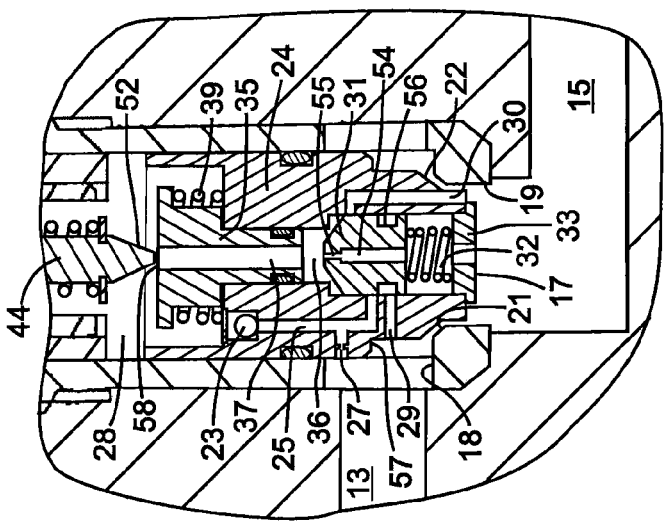
FIG. 3 is a cross sectional view through a portion of the valve in FIG. 1 illustrating the poppet moved closer toward a desired open position.
Figure 4:
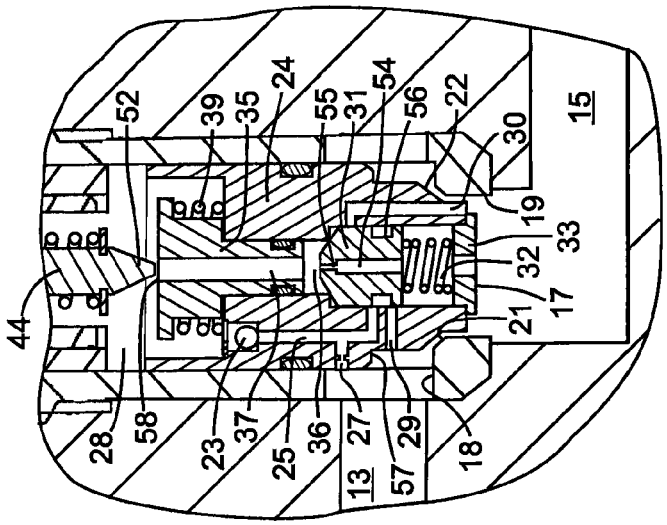
FIG. 4 is a cross sectional view through the portion of the valve showing the poppet in the desired open position.

Energizing the solenoid actuator 40 enables proportional control of the flow of hydraulic fluid between the first and second ports 18 and 19. Electric current applied to the electromagnetic coil 41 generates a magnetic field that draws the armature 42 upward into the solenoid actuator 40, which action tows the pull pin 47 and the pilot valve element 44 upward. As shown in FIG. 2, this movement initially pulls the pilot valve element 44 away from the main poppet 24, thereby providing an opening 58 between the pilot passage 37 and the control chamber 28. This introduces fluid from the control chamber into the pilot passage and the pilot chamber 36, from which the fluid continues to flow through the exhaust passage 54 in the exhaust spool 31 to the outlet port 19. As the fluid flow increases, the exhaust spool 31 is pushed away from engagement with the shoulder of the central aperture 26 as depicted in FIG. 3. This motion first closes communication between the first control passage 25 and the notch 56 in the exhaust spool 31, thereby closing the previous path between first and second control passages 25 and 29. As a result, the pressure at inlet port 18 is communicated to the control chamber 28 only through the first orifice 27 into the first control passage 25, which is a more restricted path than the previous path provided by the exhaust spool notch 56. As the exhaust spool 31 continues to move into a second position, communication is provided between the pilot passage 37 and the third control passage 30 as shown in FIG. 4, thereby releasing the control chamber pressure into the outlet port 19 connected to the tank of the hydraulic system. In the second position of the exhaust spool 31, its notch 56 no longer provides path between the first and second control passages 25 and 29 and so that the pressure from inlet port 18 is communicated to the control chamber 28 only through the first orifice 27 into the first control passage 25. The first orifice 27 restricts the rate at which the control chamber pressure can increase to level of the inlet port pressure. This restriction enables the higher pressure at the inlet port 18, than presently in the control chamber 28, to act on an annular surface 57 forcing the main poppet 24 upward away from the valve seat 21 opening the hydraulic valve 10.

In the opened state shown in FIG. 4, the main poppet 24 moves into a position at which the tip 52 of the pilot valve element 44 reaches an equilibrium gap where the pressure drops across the first orifice 27 of the first passage 25 and the pilot passage opening 58 are equal. This creates pressure in the control chamber that balances forces acting on the main poppet 24. When that force balance occurs, motion of the main poppet stops. The magnitude of the electric current applied to the electromagnetic coil 41 determines the distance that the pilot valve element 44 travels from the main poppet 24 and thus the distance that the main poppet is able to move away from the valve seat 21. Therefore, the electric current magnitude controls the degree to which the valve opens and correspondingly the amount of fluid flow through the valve 10.

Now if the electric current is removed from the electromagnetic coil 41, the first spring 45 pushes the pilot valve element 44 into the pilot passage opening 58 and against the pilot piston 35. Because there no longer is a pressure drop across the spool orifice to keep the spool in the second position, the spring 39 pushes the spool closed with trapped volume between the pilot seat and the spool being exhausted through the exhaust orifice 55. That motion of the main poppet 24 expands the control chamber which is filled with fluid flowing from the inlet port 18 through the first and second control passages 25 and 29. The notch 56 around the exhaust spool 31 provides a relatively large path between the first and second control passages 25 and 29 as compared to the parallel path through the first orifice 27. Therefore, in the present state of the exhaust spool 31 fluid flows rapidly into the control chamber enabling the main poppet 24 to close relatively fast. In other words, in this position of the exhaust spool 31 the flow of fluid from the inlet port 18 to the control chamber 28 is not restricted by the first orifice 27.

Figure 6:
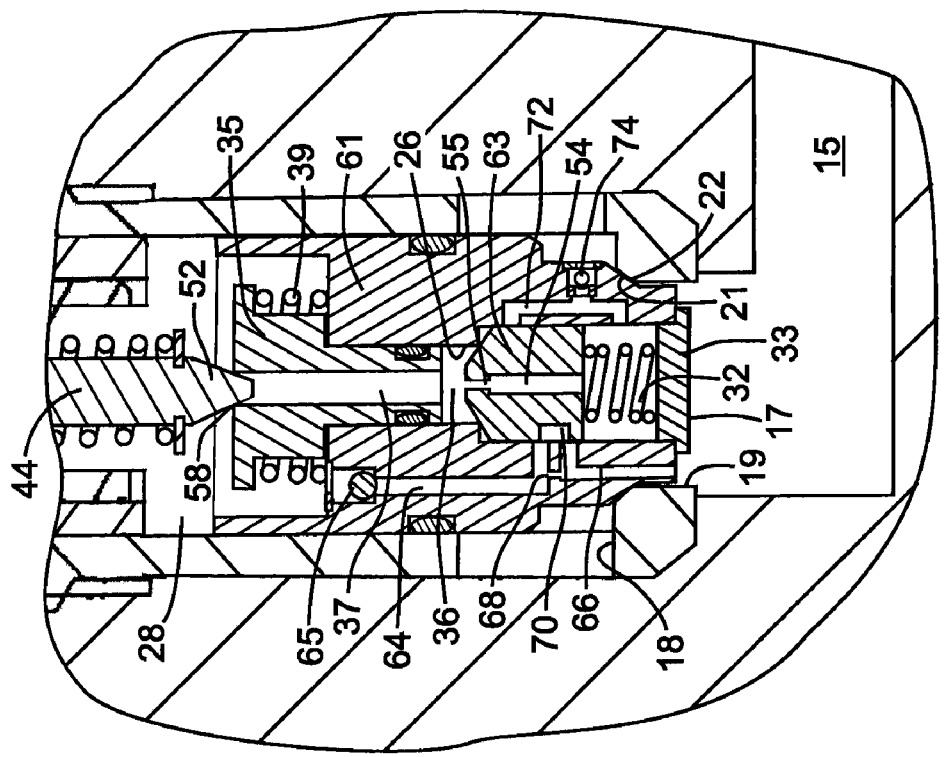
FIG. 6 is a cross sectional view that is rotated 90° about the axis of the valve bore from the cross sectional view depicted in FIG. 5.
Figure 5:
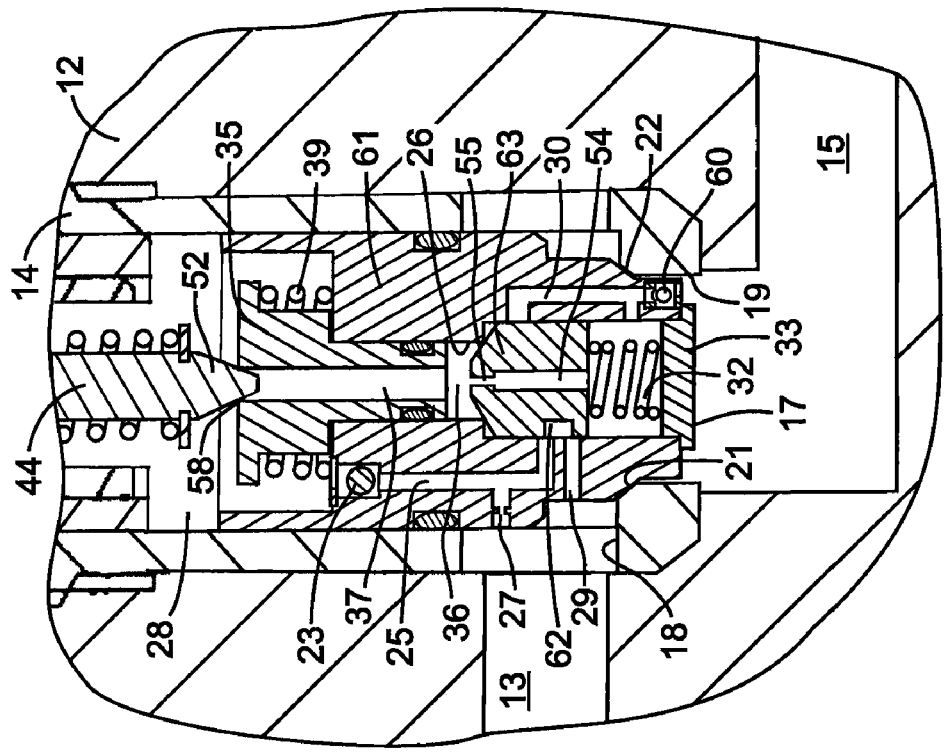
FIG. 5 is a cross sectional view similar to that in FIG. 2, except through a portion of a bidirectional valve.

With reference to FIGS. 5 and 6, a bidirectional valve also can be provided with a mechanism that causes the valve to close faster than the speed at which it opens regardless of the direction that fluid is flowing through the valve. The valve has many structural components that are identical to those in the unidirectional valve illustrated in FIGS. 1-4 with those identical components have been assigned the same reference numerals.

FIG. 5 depicts the hydraulic logic for accomplishing the fast closure when fluid flows from the first conduit 13 to the second conduit 15, as in the unidirectional version. Therefore, that hydraulic logic for this flow direction is essentially the same as that described previously with the only difference being a second check valve 60 located in the third control passage 30 of the main poppet 61. The second check valve 60 permits fluid to flow only in a direction from the pilot chamber 36 through the second port 19 and into the second conduit 15. This second check valve 60 blocks flow through the third control passage 30 when fluid is flowing through the valve in the opposite direction, from the second conduit 15 to the first conduit 13. One other variation is that the annular notch 56 in the exhaust spool 63 has been replaced by a first notch 62 that extends only partially (e.g. 45°) around the outer circumferential surface of the exhaust spool so as to only communicate with the first and second passages 25 and 29 as the exhaust spool slides longitudinally. The exhaust spool 63 is prevented from rotating in the central aperture 26 of the main poppet 61, by a key for example, while still being able to slide longitudinally.

FIG. 6 shows the hydraulic logic for accomplishing the fast closure when fluid flows from the second conduit 15 to the first conduit 13. That hydraulic logic comprises a fourth control passage 64 that extends transversely through the main poppet 61 between the central aperture 26 and the control chamber 28. A third check valve 65 is located near the opening of the fourth control passage 64 into the control chamber 28 and allows fluid to flow only in a direction from the fourth control passage into the control chamber. A fifth control passage 66 provides a fluid path linking the second port 19 to the central aperture 26. A second orifice 68 provides a path between the fourth and fifth control passages 64 and 66 and thus allows fluid to flow at any time from the second port 19 into the fourth control passage 64. A second notch 70 extends only partially (e.g. 45°) around the outer circumferential surface of the exhaust spool 63 so as to only communicate with the fourth and fifth control passages 64 and 66 as the exhaust spool slides. The second notch 70 is spaced radially around the exhaust spool 63 from the first notch 62 shown in FIG. 5.

A sixth control passage 72 forms a path in the main poppet 61 between the central aperture 26 and the first port 18. A fourth check valve 74 is located in the sixth control passage 72 and permits fluid to flow only in a direction from the pilot chamber 36 through the second port 19 into the second conduit 15. The fourth check valve 74 blocks flow through the sixth control passage 72 when fluid is flowing through the valve in the direction from the first conduit 13 to the second conduit.

The bidirectional valve functions in the same manner as described in respect of FIGS. 1-4 when fluid flows from the first port 18 to the second port 19. In that case the passages and check valves shown in FIG. 5 form the hydraulic logic that provides a fast closure operation. When flow is in the opposite direction, i.e. from the second port 19 to the first port 18, the passages and check valves shown in FIG. 6 provide the fast closure logic. The fourth and fifth control passages 64 and 66 and the second orifice 68 in the main poppet 61 along with the second notch 70 in the exhaust spool 63 function in the same manner in this flow direction as the first and second control passages 25 and 29, the first orifice 27 and the first notch 62 function when fluid flows in the other direction through the valve. Similarly the sixth control passage 72 functions in the same manner as the third control passage 30.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. For example the inlet and outlet ports of the valve could be reversed with a corresponding rearrangement of the passages through the main poppet. Accordingly, the scope of the invention should be determined from the following claims and not limited by the above disclosure.

The invention claimed is:

1. A pilot operated hydraulic valve comprising:
a body with a first port, a second port, and a valve seat between the first port and the second port;
a main poppet selectively engaging the valve seat to control flow of fluid between the first port and the second port and defining a control chamber in the body, the main poppet having an aperture that opens into the control chamber, a first control passage extending between the aperture and the control chamber and coupled through an orifice to the first port, a second control passage extending between the first port and the aperture, and a third control passage extending between the second port and the aperture;
an exhaust spool having a first position in which a first opening of the third control passage into the aperture is blocked and in which a path is provided between the first and second control passages bypassing the orifice, the exhaust spool having a second position in which fluid flow between the second port and the aperture via the third control passage is enabled and fluid flow between the first and second control passages is blocked;
pilot valve element which operates to open and close fluid communication between the control chamber and the aperture of the main poppet; and
an actuator operably coupled to move the pilot valve element.

2. The pilot operated hydraulic valve recited in claim 1 wherein the exhaust spool moves in response to fluid flow between the aperture and the second port.

3. The pilot operated hydraulic valve as recited in claim 1 further comprising an exhaust spring biasing the exhaust spool into the first position.

4. The pilot operated hydraulic valve as recited in claim 1 further comprising a check valve allowing fluid to flow only in a direction through the first control passage into the control chamber.

5. The pilot operated hydraulic valve as recited in claim 1 further comprising a pilot piston moveably received in the aperture of the main poppet and having a pilot passage there through and opening into the aperture, the pilot piston being biased away from the main poppet by a pilot spring, wherein the pilot valve element operates to open and close the pilot passage.

6. A pilot operated hydraulic valve comprising:
a body with a first port, a second port, and a valve seat between the first port and the second port;
a poppet assembly selectively engaging and disengaging the valve seat and defining a control chamber into which a pilot passage in the poppet assembly opens, the poppet assembly including a first control passage extending between the first port and the control chamber and having an orifice, a restricted exhaust passage extending between the pilot passage and the second port, and a passageway extending between the pilot passage and the second port, the poppet assembly comprising an exhaust spool that has a first position in which fluid flow through the passageway is blocked and in which a bypass path is provided around the orifice, and the exhaust spool having a second position in which fluid flow through the passageway is enabled and in which fluid flow through the bypass path is blocked;
pilot valve element which operates to open and close the pilot passage; and
an actuator operably coupled to move the pilot valve element.

7. The pilot operated hydraulic valve as recited in claim 6 wherein the exhaust spool moves in response to fluid flow between the pilot passage and the second port.

8. The pilot operated hydraulic valve as recited in claim 6 wherein the poppet assembly further comprises a check valve that allows fluid to flow only in a direction through the first control passage into the control chamber.

9. The pilot operated hydraulic valve as recited in claim 6 wherein the poppet assembly further comprises a pilot piston moveably received in an aperture and having the pilot passage therein, the pilot piston being biased outwardly from the aperture poppet by a pilot spring.

10. The pilot operated hydraulic valve as recited in claim 6 wherein the poppet assembly comprises a main poppet having an aperture in which the exhaust spool slides, a second control passage that extends between the first port and the aperture, wherein in the first position the exhaust spool provides a flow path between the first and second control passages and in the second position the flow path is blocked.

11. The pilot operated hydraulic valve as recited in claim 10 wherein the main poppet further comprises a third control passage that forms the passageway and extends between the second port and the aperture, wherein the pilot passage opens into the aperture and wherein in the first position the exhaust spool blocks fluid communication between the pilot passage and the third control passage, and in the second position the pilot passage communicates with the third control passage.

12. A pilot operated hydraulic valve comprising:
a body with an inlet port, an outlet port, and a valve seat between the inlet port and the outlet port;
a main poppet selectively engaging the valve seat to control flow of fluid between the inlet port and the outlet port and defining a control chamber, the main poppet having passages that form fluid paths between the control chamber and both of the inlet and outlet ports;
an exhaust spool which moves between first and second positions in response to fluid flow between the control chamber and the outlet port, in the first position fluid is able to flow between the inlet port and the control chamber and fluid flow between the control chamber and the outlet port is restricted by a given amount, and in the second position fluid is able to flow between the inlet port and the control chamber but is restricted more than in the first position, and in the second position fluid flow between the control chamber and the outlet port is less restricted than in the first position;
pilot valve element which operates to open and close fluid communication through the main poppet between the control chamber and outlet port; and
an actuator operably coupled to move the pilot valve element.

13. The pilot operated hydraulic valve as recited in claim 12 further comprising an exhaust spring biasing the exhaust spool into the first position.

14. The pilot operated hydraulic valve as recited in claim 12 wherein the main poppet comprises an aperture opening into the control chamber, a first control passage extending between the aperture and the control chamber and coupled through an orifice to the inlet port, a second control passage extending between the inlet port and the aperture, and a third control passage extending between the outlet port and the aperture.

15. The pilot operated hydraulic valve as recited in claim 14 wherein the exhaust spool in the first position blocks fluid flow between the control chamber and the third control passage and provides a second path by connecting the first and second control passages to bypass the orifice, and in the second position fluid flow between the control chamber and the third control passage is enabled and fluid flow between the first and second control passages is blocked.

16. The pilot operated hydraulic valve as recited in claim 14 further comprising a check valve allowing fluid to flow only in a direction through the first control passage into the control chamber.

17. The pilot operated hydraulic valve as recited in claim 14 further comprising a pilot piston moveably received in the aperture of the main poppet and having a pilot passage there through and opening into the aperture, the pilot piston being biased away from the main poppet by a pilot spring; wherein the pilot valve element operates to open and close the pilot passage.

18. A pilot operated hydraulic valve comprising:
a body with a first port, a second port, and a valve seat between the first port and the second port;
a main poppet selectively engaging the valve seat to control flow of fluid between the first port and the second port and defining a control chamber in the body, the main poppet having an aperture that opens into the control chamber, a first control passage extending between the aperture and the control chamber and coupled through a first orifice to the first port, a first check valve allowing fluid to flow only in a direction through the first control passage into the control chamber, a second control passage extending between the first port and the aperture, and a third control passage extending between the second port and the aperture, a second check valve allowing fluid to flow only in a direction through the third control passage into the second port, a fourth control passage extending between the aperture and the control chamber and coupled through a second orifice to the second port, a third check valve allowing fluid to flow only in a direction through the fourth control passage into the control chamber, a fifth control passage extending between the second port and the aperture, and a sixth control passage extending between the first port and the aperture, a fourth check valve allowing fluid to flow only in a direction through the sixth control passage into the first port;
an exhaust spool having a first position in which a first opening of the third control passage into the aperture is blocked and a second opening of the sixth control passage into the aperture is blocked, and in the first position a path is provided between the first and second control passages bypassing the first orifice and another path is provided between the fourth and fifth control passages bypassing the second orifice, the exhaust spool having a second position in which the first opening and the second opening are unblocked, fluid flow between the first and second control passages is blocked and fluid flow between the fourth and fifth control passages is blocked;
pilot valve element which operates to open and close fluid communication between the control chamber and the aperture of the main poppet; and
an actuator operably coupled to move the pilot valve element.

19. The pilot operated hydraulic valve as recited in claim 18 further comprising an exhaust spring biasing the exhaust spool into the first position.

20. The pilot operated hydraulic valve as recited in claim 18 further comprising a pilot piston moveably received in the aperture of the main poppet and providing a pilot passage between the control chamber and the aperture, the pilot piston being biased away from the main poppet by a pilot spring, wherein the pilot valve element operates to open and close the pilot passage.

* * * * *